United States Patent [19]

Tanaka et al.

[11] Patent Number: 5,623,013

[45] Date of Patent: Apr. 22, 1997

[54] XONOTLITE-REINFORCED ORGANIC POLYMER COMPOSITION

[75] Inventors: Hideho Tanaka; Yukihiko Asano; Kunio Watanabe; Hisataka Uchimura, all of Yamaguchi, Japan

[73] Assignee: Ube Industries, Ltd., Yamaguchi, Japan

[21] Appl. No.: 510,224

[22] Filed: Aug. 2, 1995

[30] Foreign Application Priority Data

Dec. 16, 1994 [JP] Japan .................................. 6-313001
Dec. 16, 1994 [JP] Japan .................................. 6-313002
Dec. 20, 1994 [JP] Japan .................................. 6-317234

[51] Int. Cl.$^6$ .............................. C08J 5/10; C08K 3/34; C08L 23/00
[52] U.S. Cl. .......................... 524/443; 524/430; 524/435; 524/439; 524/492; 524/493; 523/220; 523/216
[58] Field of Search ..................... 524/430, 435, 524/439, 492, 493, 494, 495, 496, 443; 523/220, 222, 211, 216

[56] References Cited

U.S. PATENT DOCUMENTS

| | | | |
|---|---|---|---|
| 4,401,776 | 8/1983 | Munk | 523/443 |
| 4,490,492 | 12/1984 | Skudelny et al. | 523/443 |
| 5,120,775 | 6/1992 | Vanzegbroeck et al. | 523/443 |

FOREIGN PATENT DOCUMENTS

| | | |
|---|---|---|
| 0237827A2 | 9/1987 | European Pat. Off. . |
| 48-19498 | 3/1973 | Japan . |
| 50-52145 | 5/1975 | Japan . |
| 50-158647 | 12/1975 | Japan . |
| 50-158648 | 12/1975 | Japan . |
| 51-7055 | 1/1976 | Japan . |
| 53-30499 | 3/1978 | Japan . |
| 53-33245 | 3/1978 | Japan . |
| 56-118456 | 9/1981 | Japan . |
| 60-63255 | 4/1985 | Japan . |
| 61-69848 | 4/1986 | Japan . |
| 61-192752 | 8/1986 | Japan . |
| 62-12745 | 1/1987 | Japan . |
| 62-68851 | 3/1987 | Japan . |
| 62-218445 | 9/1987 | Japan . |
| 2-88642 | 3/1990 | Japan . |
| 2-255761 | 10/1990 | Japan . |
| 2-284940 | 11/1990 | Japan . |
| 3-45652 | 2/1991 | Japan . |
| 3-52953 | 3/1991 | Japan . |
| 4-108855 | 4/1992 | Japan . |
| 4-288341 | 10/1992 | Japan . |
| 4-318064 | 11/1992 | Japan . |
| 4-361027 | 12/1992 | Japan . |
| 06128412 | 5/1994 | Japan . |
| 6-128412 | 5/1994 | Japan . |
| 61-28412 | 5/1994 | Japan . |

*Primary Examiner*—Paul R. Michl
*Assistant Examiner*—U. K. Rajguru
*Attorney, Agent, or Firm*—Panitch Schwarze Jacobs & Nadel, P.C.

[57] ABSTRACT

A Xonotlite-reinforced organic polymer composition obtained by mixing (A) an organic polymer and (B) fibrous Xonotlite, in which the fibrous Xonotlite (1) satisfies conditions (a), (b), and (c):

(a) $0.1 \ \mu m \leq D \leq 0.4 \ \mu m$
(b) $1 \ \mu m \leq L < 5 \ \mu m$
(c) $10 \leq L/D \leq 15$ wherein D and L represent an average fiber diameter and an average fiber length, respectively, of fibrous Xonotlite (B);
(2) has a BET specific surface area of not less than 21 m$^2$/g as measured by nitrogen adsorption; (3) has had its surface treated with a surface active agent and/or a coupling agent; and (4) has been formed into granules. The composition exhibits improved mechanical characteristics and improved balance between heat resistance and impact resistance.

11 Claims, No Drawings

XONOTLITE-REINFORCED ORGANIC POLYMER COMPOSITION

FIELD OF THE INVENTION

This invention relates to an organic polymer composition reinforced by an inorganic fibrous filler. Molded articles obtained from the composition are light, have high strength, high elastic modulus, and high heat resistance, and show excellent surface smoothness. The composition is therefore useful as a molding material for automobile parts, electric and electronic parts, civil engineering equipment components, precision machinery components, and the like.

BACKGROUND OF THE INVENTION

Incorporation of non-fibrous fillers having a particle or plate shape into organic polymers for improvement of characteristics is widely known. For example, addition of a nonfibrous filler to thermoplastic resins for reduction of molding shrinkage has been proposed, e.g., in JP-A-3-52953 and JP-A-4-361027 (the term "JP-A" as used herein means an "unexamined published Japanese patent application"). However, it is also well known that this method is not so effective to improve mechanical characteristics or thermal characteristics.

Incorporation of fibrous fillers or reinforcing fiber in addition to the nonfibrous fillers, so-called hybridization of fillers, has been proposed as an approach to solution of the above problem as disclosed, e.g., in JP-A-60-63255 and JP-A-62-218445. Use of fibrous Xonotlite as a fibrous filler has been attempted for this purpose (as disclosed, e.g., in JP-A-2-88642).

Blending of a modifier, such as rubber, a thermoplastic elastomer or a rubber-modified thermoplastic resin, is known as a method for improving impact resistance of thermoplastic resins (as disclosed, e.g., in JP-A-56-118456, JP-A-61-192752, and JP-A-62-68851). However, it is also known that this method incurs reduction in strength, elastic modulus, and heat resistance.

In order to eliminate the above problem, it has been proposed to incorporate reinforcing fiber, fibrous fillers, or particulate or plate-shaped nonfibrous fillers in addition to the above-mentioned modifier. Although the method of using reinforcing fiber (as disclosed, e.g., in JP-A-62-12745) is effective to improve mechanical characteristics, such as strength or elastic modulus, and heat resistance, the resulting molded articles suffer from poor appearance or anisotropy. Further, the method of using particulate or plate-shaped nonfibrous fillers (as disclosed, e.g., in JP-A-2-255761) fails to bring about sufficient improving effects on such characteristics as mentioned above while hardly causing poor appearance or anisotropy.

Hence, a combined use of nonfibrous fillers and fibrous fillers (hybridization of fillers) (as disclosed, e.g., in JP-A-4-318064) or a combined use of fibrous fillers and reinforcing fibers, such as glass fiber and carbon fiber (as disclosed, e.g., in JP-A-4-288341), has been attempted. Among the fibrous fillers meeting this purpose is included fibrous Xonotlite (as disclosed, e.g., in JP-A-61-69848 and JP-A-3-45652).

Fibrous Xonotlite as referred to above is well known as a reinforcement for resins and rubbers (as disclosed, e.g., in JP-A-48-19498, JP-A-50-52145, JP-A-53-30499, and JP-A-53-33245).

However, conventional fibrous Xonotlite has poor dispersibility in a matrix due to its liability to agglomeration and, in addition, exhibits insufficient wettability by a matrix-forming organic polymeric substance. It follows that the resulting composite material fails to display the desired physical properties.

For the purpose of improving surface properties of fibrous Xonotlite, surface treatment with a coupling agent, etc. has been attempted (as disclosed, e.g., in JP-A-50-158647, JP-A-50-158648, JP-A-51-7055, and JP-A-4-108855), but satisfactory results have not obtained yet.

JP-A-2-284940 discloses a flame retardant resin composition comprising polypropylene, glass fiber, fibrous magnesium hydroxide and/or fibrous Xonotlite, and an acid-modified polyolefin at a specific blending ratio, in which the fibrous Xonotlite has an average fiber diameter of 0.1 to 3 µm and an aspect ratio of 10 to 200.

In JP-A-2-284940, however, no consideration is given to the adhesion between fibrous Xonotlite and the matrix resin, which influences on the reinforcing effects of the fibrous Xonotlite. The problem associated with this technique is that when microcrystalline fibrous Xonotlite having a small average fiber diameter, or a short average fiber length, or a small average fiber diameter with a short average fiber length is used, such fibrous Xonotlite not only has a strong tendency to agglomeration but also is highly bulky so that it is difficult to apply as a reinforcement for resins.

In order to settle the above problem, the inventors of the present invention previously proposed specific calcium silicate hydrate (i.e., fibrous Xonotlite) and a process for producing the same as disclosed in JP-A-6-128412, characterized in that the fibrous Xonotlite used has a BET specific surface area of not less than 21 $m^2/g$ as measured by nitrogen adsorption and has been subjected to surface treatment with a surface active agent and/or a coupling agent and shaped into granules. The fibrous Xonotlite disclosed is suited for use as a reinforcement for various resins and molded articles thereof.

According to JP-A-6-128412, as having a BET specific surface area of not less than 21 $m^2/g$ as measured by nitrogen adsorption, the fibrous Xonotlite exhibits high adhesion to a matrix resin so that it exerts high reinforcing effects on a matrix resin even if it is microcrystalline as in JP-A-2-284940 supra. Further, since it has been treated with a surface active agent and/or a coupling agent and has a granular shape, it is less bulky and highly fluid and thereby easy to knead together with a resin. The technique thus achieved improvements over the conventional techniques. However, no particular consideration being given to the shape of the fibrous Xonotlite, the following problems still remain unsolved. When fibrous Xonotlite having a small average fiber diameter or a long average fiber length is used, if kneading force is weak, the fibers cannot be sufficiently dispersed in the resin and, if kneading force is strong, the fibers are apt to be broken. When fibrous Xonotlite having a large average fiber diameter or a short average fiber length is used, the reinforcing effects, that is, effects of improving mechanical strength are not sufficient.

SUMMARY OF THE INVENTION

An object of the present invention is to provide a fibrous Xonotlite/organic polymer composite material in which the fibrous Xonotlite has markedly improved wettability with the organic polymer so that the composite material exhibits far more excellent physical properties than conventional ones.

Another object of the present invention is to provide a thermoplastic resin composition that exhibits excellent mechanical characteristics, high heat resistance, and small mold shrinkage, which cannot be attained by conventional thermoplastic resin composition.

A further object of the present invention is to provide a thermoplastic resin composition that exhibits excellent balance between mechanical characteristics, heat resistance, and impact resistance and has small anisotropy, which cannot be attained by conventional thermoplastic resin composition.

Other objects and effects of the present invention will be apparent from the following description.

As a result of extensive investigations, the inventors of the present invention have found that the above objects of the present invention are accomplished by using, as a reinforcement for organic polymers, fibrous Xonotlite having specific properties, i.e., fibrous Xonotlite having a specific shape in terms of average diameter, average length and aspect ratio, and a specified specific surface area, having been subjected to surface treatment, and having been formed into granules.

The present inventors have also found that a thermoplastic resin composition having excellent mechanical characteristics (strength and elastic modulus), high heat resistance, and small mold shrinkage can be obtained by blending a thermoplastic resin as a matrix resin with fibrous Xonotlite having specific properties and therefore excellent in wettability with the matrix resin and dispersibility in the matrix resin, and a nonfibrous filler and/or reinforcing fiber at a specific ratio.

They have further found that a thermoplastic resin composition which exhibits excellent balance between mechanical characteristics (strength and elastic modulus), heat resistance, and impact resistance and has small anisotropy can be obtained by blending a thermoplastic resin as a matrix resin with fibrous Xonotlite having specific properties and therefore excellent in wettability with the matrix resin and dispersibility in the matrix resin, a nonfibrous filler or reinforcing fiber, and rubber, a thermoplastic elastomer or a rubber-modified thermoplastic resin at a specific ratio.

The present invention has been completed based on these findings.

The present invention relates to, as a first embodiment, a Xonotlite-reinforced organic polymer composition obtained by mixing (A) an organic polymer and (B) fibrous Xonotlite, in which the fibrous Xonotlite (1) satisfies conditions (a), (b), and (c):
  (a) $0.1\ \mu m \leq D \leq 0.4\ \mu m$
  (b) $1\ \mu m \leq L < 5\ \mu m$
  (c) $10 \leq L/D \leq 15$ wherein D and L represent an average fiber diameter and an average fiber length, respectively, of fibrous Xonotlite (B);

(2) has a BET specific surface area of not less than 21 $m^2/g$ as measured by nitrogen adsorption;

(3) has had its surface treated with a surface active agent and/or a coupling agent; and (4) has been formed into granules.

The present invention also relates to, as a second embodiment, a Xonotlite-reinforced organic polymer composition according to the first embodiment above, wherein the composition further comprises (C) a nonfibrous filler and/or reinforcing fiber;

the organic polymer (A) comprises (A1) a thermoplastic resin;

the total amount of components (B) and (C) is from 5 to 65% by weight based on the total amount of components (A1), (B), and (C); and the total amount of component (B) is from 5 to 70% by weight based on the total amount of components (B) and (C).

The present invention further relates to, as a third embodiment, a Xonotlite-reinforced organic polymer composition according to the second embodiment above, wherein the organic polymer (A) comprises (A1) a thermoplastic resin and (A2) at least one polymer selected from the group consisting of rubber, a thermoplastic elastomer, and a rubber-modified thermoplastic resin;

the total amount of components (B) and (C) is from 5 to 65% by weight based on the total amount of components (A1), (A2), (B), and (C);

the amount of component (A2) is from 5 to 70% by weight based on the total amount of components (A1) and (A2); and the amount of component (B) is from 5 to 70% by weight based on the total amount of components (B) and (C).

DETAILED DESCRIPTION OF THE INVENTION

The term "fibrous Xonotlite" as referred to herein denotes an acicular crystalline substance of Xonotlite represented by rational formula: $Ca_6Si_6O_{17}(OH)_2$ and chemical formula: $6CaO \cdot 6SiO_2 \cdot H_2O$.

The specific surface area of the fibrous Xonotlite to be used in the present invention is of great importance and must be not less than 21 $m^2/g$, preferably not less than 30 $m^2/g$, as measured in accordance with a BET method by nitrogen adsorption (hereinafter the same). If the BET specific surface area is less than 21 $m^2/g$, the fibrous Xonotlite fails to achieve the objects of the present invention due to its poor wettability with an organic polymer. Cases are sometimes met with, in which the fibrous Xonotlite whose specific surface area clears the lower limit (21 $m^2/g$ or more) but is less than 30 $m^2/g$ has insufficient wettability by an organic polymer and thereby exhibits reduced dispersibility, only to provide insufficient reinforcing effects upon the polymer.

It is also essential for the fibrous Xonotlite to satisfy all of the following conditions relating to average fiber length (L), average fiber diameter (D), and aspect ratio (L/D): (a) $0.1\ \mu m \leq D \leq 0.4\ \mu m$; (b) $1\ \mu m \leq L < 5\ \mu m$; and (c) $10 \leq L/D \leq 15$.

Fibrous Xonotlite having D of less than 0.1 μm or having L of not less than 5 μm is apt to be broken while being formed into granules or mixed and kneaded with the organic polymers. Fibrous Xonotlite having D of more than 0.4 μm or having L of less than 1 μm tends to fail to produce sufficient effects of improving mechanical strength of composite materials.

if the aspect ratio L/D is less than 10, the resulting composite material tends to fail to have sufficient mechanical strength. If L/D is more than 15, the fibrous Xonotlite has too high a bulk specific gravity, making kneading difficult in the preparation of a composite material. Further, the melt of the composite material has reduced fluidity to cause breakage of the extruded strands, making kneading instable. Furthermore, the resulting molded articles tend to have deteriorated surface smoothness or increased anisotropy.

While the process for producing the fibrous Xonotlite to be used in the present invention is not particularly limited, it is preferable to use the process described in JP-A-6-

128412, which consists of hydrothermal reaction of a calcareous raw material and a siliceous raw material mixed at a specific ratio.

The calcareous raw materials include quick lime and slaked lime. Those with a low impurity content are preferred. The siliceous raw materials include grinds of siliceous stone, siliceous sand or quartz, silicic acid, silicic anhydride, silica gel, and diatomaceous earth. Those with a low impurity content and finely divided to a particle size of not greater than 10 µm are preferred. The mixing ratio of the calcareous raw material and the siliceous raw material in terms of a Ca/Si ratio is preferably slightly smaller than the theoretical equivalence, e.g., from 0.8 to 0.99. The amount of water to be mixed is generally from 5 to 40 times, preferably from 8 to 30 times, the total amount of the calcareous raw material and the siliceous raw material.

The hydrothermal reaction can be carried out by stirring the calcareous raw material, the siliceous raw material, and water in an autoclave at 180° to 240° C. usually for 1 to 8 hours. The reaction temperature and time are important factors for obtaining desired fibrous Xonotlite. If the reaction temperature and time are out of the above-described respective range, there may be the cases in that fibrous Xonotlite having the above-specified specific surface area cannot be produced.

The resulting fibrous Xonotlite should be subjected to surface treatment with a surface active agent and/or a coupling agent (hereinafter inclusively referred to as a surface treating agent) in order to further improve the reinforcing effects. That is, the surface treating agent is used for the purpose of improving the affinity of the fibrous Xonotlite to an organic polymer that becomes a matrix, thereby enhancing the reinforcing effects to bring about increased mechanical strength.

The surface active agent which can be used in the present invention may be any of anionic surface active agents, cationic surface active agents, amphoteric surface active agents, and nonionic surface active agents. Examples of the anionic surface active agents include alkyl ether sulfates, dodecylbenzenesulfonates, and stearates. Examples of the cationic surface active agents include tetradecylamineacetates and alkyltrimethylammonium chlorides. Examples of the amphoteric surface active agents include dimethylalkyllaurylbetaines. Suitable nonionic surface active agents include polyoxyethylene octadecylamine and polyoxyethylene lauryl ether.

Examples of the coupling agent which can be used in the present invention includes silane coupling agents, titanate coupling agents, aluminum coupling agents, chromium coupling agents, and boron coupling agents.

The surface treating agent is added in an amount of 0.1 to 10% by weight, preferably 0.5 to 8% by weight, based on the amount of the fibrous Xonotlite on dry basis. If the amount of addition is less than 0.1% by weight, the effects exerted are insufficient. Even if it exceeds 10% by weight, no further enhancement of the effects of addition results.

While not limiting, the surface treatment of fibrous Xonotlite can be carried out as follows. The above-mentioned surface treating agent is added to a slurry of fibrous Xonotlite either as taken out from the autoclave for hydrothermal synthesis or after being diluted with an appropriate amount of water, and the mixture is stirred in an suitable apparatus. Excess water is removed by means of a centrifugal dryer, a filter press, etc. to collect cake of fibrous Xonotlite.

The surface treatment may also be conducted by once drying the cake of fibrous Xonotlite collected from the slurry and then treating the dried fibrous Xonotlite with the surface treating agent dissolved in a small amount of water or a solvent, but this method has no merit because the operation is complicated, and the effects derived from the surface treating agent are small.

It is also essential for the fibrous Xonotlite to be used in the present invention to have a granular shape so as to facilitate mixing and kneading with an organic polymer.

Granular fibrous Xonotlite can be obtained by shaping the cake of fibrous Xonotlite having adhered thereto a surface treating agent into granules of 1 to 8 mm in diameter by means of a granulator, followed by drying. In the case where a coupling agent has been used as a surface treating agent, the dried granules are further subjected to heat treatment.

The granulator to be used is not particularly limited and any known granulator may be employed, including a rotary vertical granulator, a rotary drum granulator, a rotary tray granulator, a screw extrusion granulator, and a roll extrusion granulator. The resulting granules preferably have a diameter of 1 to 8 mm. Otherwise, it tends to be difficult to knead the granules with an organic polymer by means of a single-screw extruder or a twin-screw extruder. This being the case, fibrous Xonotlite must be successively loaded by means of a roll or a Banbury mixer to conduct kneading, resulting in serious destruction of the fibers, which would lead to reduction in mechanical strength.

Drying of the granules can be carried out by means of a known drier, such as a drier with internal air circulation and an infrared heating drier, at a temperature of 100° to 150° C. over 20 to 30 hours preferably until the water content is reduced to 1% by weight or less. The subsequent heat treatment, which is conducted when a coupling agent is used in the surface treatment, is preferably conducted at a temperature of 100° to 150° C. for 20 to 30 hours.

The cake of surface-treated fibrous Xonotlite may be once dried and, if necessary, heat treated, and then crushed into granules having a particle diameter of about 5 mm, but this method is not so preferred since it is liable to produce dust, and the resulting granules are slightly too bulky for easy handling.

The organic polymer which can be used in the present invention as component (A) is generally well-known organic polymers inclusive of thermoplastic resins, thermosetting resins, rubber and elastomers. Because the aforesaid fibrous Xonotlite used in the present invention has a decomposition temperature of 680° to 700° C. (in air), even organic polymers having a high melting point can be used suitably.

Examples of the thermoplastic resins as component (A1) include polyolefin resins, polystyrene resins, polyamide resins, polyester resins, polyether resins, polysulfone resins, polyphenylene sulfide resins, polyimide resins, and fluorine resins. Also included are a mixture of two or more of these thermoplastic resins called a polyblend, copolymers comprising monomers composing these thermoplastic resins, and polymer alloys comprising these thermoplastic resins.

Specific examples of the thermoplastic resins include polyolefin resins, such as polyethylenes having various densities and various molecular weights, linear low-density polyethylene, ethylene copolymers (e.g., ethylene-vinyl acetate copolymer and ethylene-propylene copolymer), propylene homopolymers, propylene copolymers (e.g., ethylene-propylene block copolymer), modified polypropylene, polybutene-1, and poly-4-methylpentene-1; polyvinyl alcohol copolymers, polystyrene, high impact polystyrene, ABS resins, polyvinyl chloride resins, acrylonitrile-styrene resins, maleic anhydride-styrene resins; polyamide resins, such as polycaprolactam (nylon 6), polytetramethylene adipamide (nylon 46), polyhexamethylene adipamide (nylon 66), polyhexamethylene sebacamide (nylon 610), polyhexamethylene dodecanoamide (nylon 612), polyhexamethylene terephthalamide (nylon 6T), polyhexamethylene isophthalamide (nylon 6I), polyundecanamide (nylon 11), polydodecanamide (nylon 12), nylon 6/66, nylon 6/11, nylon 6/12, nylon 6/610, nylon 6/612, nylon 66/610, nylon 6/66/610, nylon 6/66/12, nylon 6/6T, nylon 6/6I, nylon 66/6T, nylon 66/6I, nylon 6/11/6T, nylon 6/12/6T, nylon 66/11/6T, nylon 66/12/6T, nylon 11/6T/6I, and nylon 12/6T/6I; polyester resins, such as polybutylene terephthalate, polyethylene terephthalate, and other aromatic polyesters; polycarbonate resins, polyacetal resins (inclusive of homopolymers and copolymers), polyphenylene ether, modified polyphenylene ether, polyether ether ketone, polysulfone, polyether sulfone, polyarylene sulfide resins, polyether-imide, thermoplastic polyimide, thermoplastic polyamide-imide; fluorine resins, such as polyetetrafIfuoroethylene, tetrafluoroethylene-hexafluoropropylene copolymers, tetrafluoroethylene-ethylene copolymers, tetrafluoroethylene-perfluoroalkyl vinyl ether copolymers, polychlorotrifluoroethylene, polyvinylidene fluoride, and tetrafluoroethylene-hexafluoropropylene-perfluoroalkyl vinyl ether copolymers; and mixtures of two or more thereof.

Among the above polymers, polyolefin resins, polyamide resins, polyester resins, polyacetal resins, polyarylene sulfide resins, ABS resins, and mixtures thereof are preferred. Still preferred are propylene homopolymers, propylene copolymers (e.g., ethylene-propylene block copolymers) acrylonitrile-butadiene-styrene (ABS) resins, nylon 6, nylon 66, nylon 12, nylon 6/66, nylon 6/66/12, nylon 66/6T, polybutylene terephthalate, polyacetal resins, and polyarylene sulfide resins, and mixtures thereof.

Examples of the rubber as component (A2) includes unvulcanized or uncrosslinked rubbers, such as natural rubber, fluorine rubber, silicone rubber, acrylic rubber, styrene-butadiene rubber, butadiene rubber, chloroprene rubber nitrile rubber, ethylene-propylene rubber (EPR), ethylene-propylene-diene rubber (EPDM), isoprene rubber, butyl rubber, chlorosulfonated polyethylene, etc., and mixtures of two or more thereof.

Examples of the thermoplastic elastomer as component (A2) includes polystyrene elastomers (e.g., styrene-butadiene-styrene elastomer (SBS) and styrene-ethylene-butadiene-styrene elastomer (SEBS)), polyurethane elastomers, polyolefin elastomers, polyester elastomers, polyamide elastomers, ethylene-vinyl acetate copolymers, 1,2-polybutadiene, ionomers, ethylene-acrylic ester copolymers, and vinyl chloride elastomers, and mixtures of two or more thereof. Preferred of these rubbers and elastomers are EPR, EPDM, SEBS, SBS, ionomers, and mixtures thereof.

Examples of the rubber-modified thermoplastic resin as component (A2) includes those prepared not by mechanical mixing but by polymerization, such as impact-resistant ABS resins, acrylonitrile-ethylenepropylene-styrene resins, acrylonitrile-acrylic rubber-styrene resins, and high impact polystyrene resins, and mixtures of two or more thereof. Impact-resistant ABS resins are particularly preferred.

At least one polymer selected from the above-mentioned rubbers, thermoplastic elastomers, and rubber-modified thermoplastic resins can be used as component (A2) to be combined with thermoplastic resin (A1).

In the case where thermoplastic resin (A1) is used in combination with component (A2), a polyamide resin as component (A1) is preferably combined with EPDM, an ionomer, an impact-resistant ABS resin, or a mixture thereof; a polyester resin as component (A1) is preferably combined with SEBS, SBS, an impact-resistant ABS resin or a mixture thereof; a polyolefin resin as component (A1) is preferably combined with EPR, EPDM or a mixture thereof; a polyarylene sulfide resin as component (A1) is preferably combined with SEBS; and a polyacetal resin as component (A1) is preferably combined with EPDM.

Component (C) comprises at least one of nonfibrous fillers and reinforcing fibers.

The term "nonfibrous filler" which can be used as component (C) denotes fillers having a particle shape or a plate shape. Examples of the nonfibrous filler (C) include woodmeal; flakes or powder of metal, such as iron, copper, silver, gold or aluminum; carbon material, such as carbon black, graphite, activated carbon, or carbon hollow spheres; oxides, such as silica, alumina, silica-alumina, titanium oxide, iron oxide, zinc oxide, magnesia, and calcium oxide; silicates, such as talc, clay, and mica; hydroxides, carbonates, sulfates, phosphates, borates, borosilicates, aluminosilicates, titanates, basic sulfates, basic carbonates and other basic salts of various metals; glass material, such as glass hollow spheres and glass flakes; ceramics, such as silicon carbide, silicon nitride, aluminum nitride, murite, and cordierite; and waste, such as fly ash and micro silica. These fillers may be used either individually or as a combination of two or more thereof.

While not limiting, the nonfibrous filler having a particle shape generally has an average diameter of from 0.01 to 100 μm, preferably from 0.1 to 20 μm; and that having a plate shape generally has an average diameter of from 0.1 to 300 μm, preferably from 1 to 100 μm, and an aspect ratio of from 5 to 100, preferably from 10 to 70.

The reinforcing fiber which can be used as component (C) may be any of those commonly employed for reinforcement of thermoplastic resins. Examples thereof include glass fiber, carbon fiber, organic polymer fibers, such as aramid fiber, polyether ketone fiber, liquid crystal polyester fiber, and polyimide fiber; inorganic fibers, such as silica fiber, alumina fiber, silica-alumina fiber, silicon carbide fiber, and silicon nitride fiber; and fiber of metals, such as stainless steel, aluminum, magnesium, iron, copper, titanium, brass, gold, and silver. While not limiting, the form of chopped strands is the most suitable. Chopped strands typically have a length of about 1 to 10 mm, preferably about 3 to 6 mm. Roving, woven fabric, nonwoven fabric or a mat may also be used as well. These reinforcing fibers may be subjected to a known surface treatment, for example, surface coating with a surface treating agent, such as the above-described surface active agent or coupling agent. While these reinforcing fibers are usually used individually, they may be used as a combination of two or more thereof.

If desired, the Xonotlite-reinforced organic polymer composition according to the present invention may further contain additives for improvement of characteristics or production process as far as the reinforcing effects of the fibrous Xonotlite (B) are not impaired. Examples of the additives include heat stabilizers, light stabilizers, plasticizers, crosslinking agents, antioxidants, flame retardants, reinforcing agents, pigments, dyes, lubricants, antistatics, mold release agents, and perfumes.

In the first embodiment of the present invention, the content of the fibrous Xonotlite (B) in the composition is generally from 5 to 75% by weight, preferably 10 to 50% by weight, based on the total amount of the organic polymer (A) and the fibrous Xonotlite (B), in the case where a thermoplastic resin, rubber, or an elastomer is used as the organic polymer (A). If it is less than 5% by weight, improvement on mechanical strength and rigidity of molded articles may not be obtained. If it exceeds 75% by weight, the composition tends to be difficult to knead and mold. The content of the fibrous Xonotlite (B) in the composition is generally from 5 to 96% by weight, preferably 10 to 70% by weight, based on the total amount of the organic polymer (A) and the fibrous Xonotlite (B), in the case where a thermosetting resin is used as the organic polymer (A). If it is less than 5% by weight, improvement on mechanical strength and rigidity of molded articles may not be obtained. If it exceeds 96% by weight, the composition tends to be difficult to knead and mold, and the molded articles may have reduced strength.

In the second embodiment of the present invention, i.e., the thermoplastic resin composition comprising the thermoplastic resin (A1), the fibrous Xonotlite (B), and the nonfibrous filler or reinforcing fiber (C), the total content (Wf) of components (B) and (C) should be from 5 to 65% by weight, preferably 10 to 50% by weight, based on the total amount of components (A1), (B), and (C). If it is less than 5% by weight, the mechanical strength, heat resistance and mold shrinkage of the resulting thermoplastic resin composition are not improved. If it exceeds 65% by weight, the composition has increased melt viscosity, leading to difficulty in molding and deterioration of appearance of the resulting molded articles. In order to prevent these unfavorable phenomena, the total content (Wf) of components (B) and (C) should be within the above-specified preferred range.

In the second embodiment, the weight percentage (Wb) of component (B) based on the total amount of components (B) and (C) should be from 5 to 70% by weight, preferably 10 to 60% by weight. If it is less than 5% by weight, the improving effect of component (B) is small. If it exceeds 70% by weight, the characteristics essential to component (C) cannot be exhibited sufficiently. Cases are sometimes observed, in which the above-described unfavorable phenomena occur when the weight percentage (Wb) of component (B) clears the lower limit (not less than 5% by weight) but is less than 10% by weight or when it clears the upper limit (not more than 70% by weight) but exceeds 60% by weight.

In the third embodiment of the present invention, i.e., the thermoplastic resin composition comprising the thermoplastic resin (A1), the polymer (A2) selected from rubber, thermoplastic elastomers and rubber-modified thermoplastic resins, the fibrous Xonotlite (B), and the nonfibrous filler or reinforcing fiber (C), the total content (Wf) of components (B) and (C) should be from 5 to 65% by weight, preferably 10 to 50% by weight, based on the total amount of components (A1), (A2), (B), and (C). If it is less than 5% by weight, the mechanical strength, heat resistance and mold shrinkage of the resulting thermoplastic resin composition are not improved. If it exceeds 65% by weight, the composition has increased melt viscosity, leading to difficulty in molding and deterioration of appearance of the resulting molded articles. In order to prevent these unfavorable phenomena, the total content (Wf) of components (B) and (C) should be within the above-specified preferred range.

Further, the weight percentage (Wa) of polymer (A2) based on the total amount of the thermoplastic resin (A1) and the polymer (A2) should be from 5 to 70% by weight, preferably from 10 to 65% by weight. If it is less than 5% by weight, the effect of improving impact resistance is small. If it exceeds 70% by weight, the characteristics essential to component (A1) as a matrix resin are impaired. Cases are sometimes met with, where the above-described adverse phenomena occur when the weight percentage (Wa) of component (A2) clears the lower limit (not less than 5% by weight) but is less than 10% by weight or when it clears the upper limit (not more than 70% by weight) but exceeds 65% by weight.

Furthermore, in the third embodiment, the weight percentage (Wb) of component (B) based on the total amount of components (B) and (C) should be from 5 to 70% by weight, preferably 10 to 65% by weight. If it is less than 5% by weight, the improving effect of component (B) is small. If it exceeds 70% by weight, the characteristics essential to component (C) cannot be exhibited sufficiently. Cases are sometimes observed, in which the above-described adverse phenomena occur when the weight percentage (Wb) of component (B) clears the lower limit (not less than 5% by weight) but is less than 10% by weight or when it clears the upper limit (not more than 70% by weight) but exceeds 65% by weight.

A preparation method of the fibrous Xonotlite-reinforced organic polymer compositions according to the present invention is not particularly limited, and they can be prepared as follows, for example.

In the first embodiment, the composition comprising fibrous Xonotlite and a thermoplastic resin is prepared in a conventional manner by mixing them in a prescribed ratio. For example, the components are melt-kneaded by means of an extruder and pelletized.

In the case of using a crystalline thermoplastic resin, the melt-kneading temperature is preferably set at a temperature higher than the melting point of the resin by 10° to 60° C., preferably by 10° to 40° C. In using an amorphous thermoplastic resin, it is preferably set at a temperature higher than the glass transition point of the resin by 110° to 160° C., preferably by 110° to 140° C. If the melt-kneading temperature is lower than the melting point of a crystalline resin plus 10° C. or lower than the glass transition point of an amorphous resin plus 110° C., the melt viscosity of the molten resin becomes too high in an extruder, and some parts of the resin are kept below the melting point or glass transition point, which parts may be solidified during kneading to cause extrusion instability. If the melt-kneading temperature is higher than the melting point of a crystalline resin plus 60° C. or higher than the glass transition point of an amorphous resin plus 160° C., the thermoplastic resin undergoes thermal decomposition or thermal degradation to cause coloration or reduction in physical properties.

The extruder which can be used for melt-kneading includes a screw extruder, e.g., a single-screw extruder or a twin-screw extruder, an elastic extruder, a hydrodynamic extruder, a continuous ram extruder, and a gear extruder, with a screw extruder, particularly a twin-screw extruder being preferred.

The order of addition and mixing of fibrous Xonotlite and a thermoplastic resin is arbitrarily selected. For example, fibrous Xonotlite and a thermoplastic resin may be premixed and fed to the hopper of an extruder, or only a thermoplastic resin is fed to the hopper while fibrous Xonotlite is fed to the downstream feed part of the extruder. If desired, the aforementioned various additives may be added.

The resulting composition can be molded in a conventional manner by injection molding, extrusion molding, compression molding, blow molding, and the like.

The composition may also be prepared by reactive processing, in which a polymer precursor, such as a monomer(s) or an oligomer(s), is mixed with fibrous Xonotlite and subjected to polymerization simultaneously with molding.

Reaction injection molding (RIM) and reactive extrusion may be mentioned as examples of reactive processing. Monomers applicable to reactive processing for the production of the Xonotlite-reinforced thermoplastic resin composition include lactams and methyl methacrylate.

The composition comprising fibrous Xonotlite and a thermosetting resin is prepared by well mixing or kneading the components and, if necessary, a curing agent, a curing catalyst, a curing accelerator, and, if desired, the above-mentioned various additives by means of a mixer, a kneader, a roll, etc.

The curing agent, curing catalyst or curing accelerator which can be used in the production of the composition comprising fibrous Xonotlite and a thermosetting resin varies depending on the kind of the thermosetting resin. For example, an unsaturated polyester resin is cured by using a curing catalyst, such as organic peroxides, or a combination of a curing catalyst and a cobalt type or a tertiary amine curing accelerator. An epoxy resin is cured by using a curing agent, such as an aliphatic amine, an aromatic amine, an organic acid anhydride, polyamide, phenol, a $BF_3$·monomethylamine complex compound, etc. A resol phenolic resin is cured only by heating under pressure. A novolak phenolic resin is cured by using a hexamethylenetetramine curing agent. The most suitable curing agent, curing catalyst or curing accelerator can be selected from known curing systems according to the kind of the thermosetting resin to be cured.

The resulting composition can be molded by compression molding, transfer molding, injection molding, RIM, casting, and the like.

The composition comprising rubber or an elastomer and fibrous Xonotlite is prepared by kneading the components, if necessary, together with a crosslinking agent and a crosslinking accelerator and, if desired, various additives in a Banbury mixer, a roll, a twin-screw extruder, etc.

Examples of suitable crosslinking agents include sulfur or sulfur-containing organic compounds (so-called vulcanizers) and non-sulfur type crosslinking agents, such as peroxides, metal oxides, polyfunctional amines, quinone dioxime, and azo compounds. A crosslinking accelerator is used particularly for peroxide crosslinking. Suitable crosslinking accelerator include polyfunctional monomers, such as triallyl cyanurate, triallyl isocyanurate, divinylbenzene, and trimethylolpropane trimethacrylate.

The resulting composition can be molded by means of a calender, an extruder, etc., followed by crosslinking by means of a press, etc. In using a thermoplastic elastomer which needs no particular crosslinking step may be injection molded directly.

The preparation of the thermoplastic resin compositions according to the second and third embodiments may be conducted in the similar manner as in the first embodiment. The order of addition and mixing of thermoplastic resin (A1), polymer (A2) if any, fibrous Xonotlite (B), and non-fibrous filler or reinforcing fiber (C) in melt-kneading is arbitrarily selected. For example, fibrous Xonotlite (B) and thermoplastic resin (A1), polymer (A2), and component (C) may be pre-mixed and fed to the hopper of an extruder, or thermoplastic resin (A1), polymer (A2), and component (C) are fed to the hopper while fibrous Xonotlite (B) is fed to the downstream feed part of the extruder, or thermoplastic resin (A1) and polymer (A2) are fed to the hopper, while fibrous Xonotlite (B) and component (C) are fed to the downstream feed part of the extruder either simultaneously or separately. If desired, the aforementioned various additives may be added.

In the Xonotlite-reinforced organic polymer composition of the present invention, the fibrous Xonotlite in the resulting composition obtained by melt-kneading of fibrous Xonotlite (B) and thermoplastic resin (A), mixing or kneading of fibrous Xonotlite (B) and thermosetting resin (A), or kneading of fibrous Xonotlite (B) and rubber or an elastomer (A) preferably has an average fiber length (L) of from 0.5 to 4 μm. The preparation conditions are therefore preferably selected to attain the above range of the average fiber length (L). On application of shearing force, fibrous Xonotlite are broken to have a reduced average fiber length, but it is preferred that the fibers should maintain the above-specified average fiber length so as to manifest sufficient reinforcing effects.

If the average fiber length of the fibrous Xonotlite in the compositions is less than 0.5 μm, the compositions tend to have reduced mechanical strength. If it is greater than 4 μm, the mixing or kneading with the organic polymer tends to be insufficient, sometimes failing to provide a homogeneous composition.

The present invention will now be illustrated in greater detail with reference to Examples, but it should be understood that the present invention is not construed as being limited thereto. Unless otherwise indicated, all the percents, parts, and ratios are by weight.

The physical properties of molded articles obtained in Examples and Comparative Examples were evaluated in accordance with the following test methods.

(1) Tensile Characteristics and Bending Characteristics:

A test piece (a molding article) obtained from a compound comprising fibrous Xonotlite and an organic polymer, etc. was conditioned at 23° C. and a relative humidity (RH) of 50% (except that samples using nylon resins were conditioned in a desiccator) for 48 hours before measurement. Measurement was made with Tensilon UTM-5T, manufactured by Orientec K.K., at 23° C. and 50% RH (except that measurement for samples using nylon resins was made in an absolute dry condition) in accordance with ASTM D638 and ASTM D790.

(2) Izod Impact Strength or Charpy Impact Strength:

Notched Izod impact strength or Charpy impact strength of a test piece having been conditioned in the same manner as in (1) above was measured with an Izod or Charpy impact tester manufactured by Toyo Seiki Co., Ltd. in accordance with ASTM D256 under the same measuring conditions as in (1) above.

(3) Deflection Temperature under Load:

Measurement was made with a heat distortion tester manufactured by Toyo Seiki Co., Ltd. using a test piece having been conditioned in the same manner as in (1) above. The deflection temperature was measured under a stress of 1.82 MPa in accordance with ASTM D648.

The stress imposed was changed to 0.45 MPa in testing thermoplastic resin compositions mainly comprising polypropylene.

(4) Mold Shrinkage Coefficient:

A thermoplastic resin composition was injection molded using a mold having a mold dimension of 100 mm in length, 100 mm in width, and 3 mm in thickness. After conditioning the resulting plate in the same manner as in (1) above, the dimension of the plate in the machine direction (MD) and the transverse direction (TD) was measured with a three dimensional meter BX303, manufactured by Mitsutoyo K.K., to obtain a mold shrinkage coefficient (ratio of dimensional change to the mold dimension) in each direction.

(5) Anisotropy:

MD and TD mold shrinkage coefficient were obtained in the same manner as in (4) above. Anisotropy of mold shrinkage coefficient is expressed in terms of TD/MD ratio.

(6) Appearance of Molded Article:

The plate-shaped test piece prepared in (4) above was observed with the naked eye to evaluate appearance. The appearance was graded "good" (smooth surface and excellent appearance or "poor" (roughness due to the fibers coming up to the surface, and poor appearance).

REFERENCE EXAMPLE 1

Quick lime (430 g; a product of Calceed K.K.; CaO purity: 98%) as a calcareous raw material, 470 g of stone powder for agriculture (a product of Japan General K.K.; Blaine specific surface area: 7,000 cm$^2$/g; $SiO_2$ purity: 97%), and 18 l of tap water were put in a 30 l-volume autoclave made of SUS 316 and equipped with a stirrer. The mixture was heated up to 220° C. at a rate of temperature increase of 2° C./min while stirring at 80 rpm and kept at that temperature for 5 hours to conduct hydrothermal synthesis reaction. The reaction mixture was allowed to cool with stirring over 10 hours to obtain a fibrous Xonotlite slurry. As a result of X-ray diffractometry of the slurry, only Xonotlite was identified.

To 920 g (solid basis) of the resulting fibrous Xonotlite slurry were added about 18 l of tap water and 46 g (5% based on the solid content of the Xonotlite) of a nonionic surface active agent (polyoxyethylene octadecylamine; Nymeen 204, produced by Nippon Oil & Fats Co., Ltd.), and the mixture was dispersed in a homogenizer to conduct surface treatment. The resulting slurry was filtered using a Buchner funnel, and the wet cake was shaped into granules of 3 mm in diameter by means of a granulator and dried at about 100° C. to obtain surface-treated granular fibrous Xonotlite. The granular fibrous Xonotlite was found to have a BET specific surface area of 39 m$^2$/g as measured by nitrogen adsorption, an average fiber length of 3 μm and an average fiber diameter of 0.2 μm as measured from a scanning electron micrograph, and therefore an aspect ratio of 15. The resulting fibrous Xonotlite is designated fibrous Xonotlite A.

REFERENCE EXAMPLE 2

Fibrous Xonotlite B having a BET specific surface area of 24 m$^2$/g, an average fiber length of 4 μm, and an average fiber diameter of 0.2 μm (aspect ratio: 20) was prepared in the same manner as in Reference Example 1, except for changing the hydrothermal reaction temperature from 220° C. to 240° C.

REFERENCE EXAMPLE 3

Fibrous Xonotlite C having a BET specific surface area of 16 m$^2$/g, an average fiber length of 10 μm, and an average fiber diameter of 0.2 μm (aspect ratio: 50) was prepared in the same manner as in Reference Example 1, except for changing the hydrothermal reaction temperature from 220° C. to 260° C.

REFERENCE EXAMPLE 4

Fibrous Xonotlite D having a BET specific surface area of 39 m$^2$/g, an average fiber length of 3 μm, and an average fiber diameter of 0.2 μm (aspect ratio: 15) was prepared in the same manner as in Reference Example 1, except that the nonionic surface active agent was not added.

REFERENCE EXAMPLE 5

Fibrous Xonotlite E having a BET specific surface area of 39 m$^2$/g, an average fiber length of 3 μm, and an average fiber diameter of 0.2 μm (aspect ratio: 15) was prepared in the same manner as in Reference Example 1, except that the wet cake of fibrous Xonotlite was directly dried and then crushed in an impact mill.

REFERENCE EXAMPLES 6 AND 7

Fibrous Xonotlite F and G having a BET specific surface area of 39 m$^2$/g, an average fiber length of 3 μm, and an average fiber diameter of 0.2 μm (aspect ratio: 15) were prepared in the same manner as in Reference Example 1, except that the nonionic surface active agent used in Reference Example 1 was replaced with γ-aminopropyltriethoxysilane or γ-glycidoxypropyltrimethoxysilane, respectively, and that the dried granules were further subjected to heat treatment at 120° C. for 20 minutes.

REFERENCE EXAMPLE 8

Fibrous Xonotlite H having a BET specific surface area of 42 m$^2$/g, an average fiber length of 10 μm, and an average fiber diameter of 0.2 μm (aspect ratio: 50) was prepared in the same manner as in Reference Example 1, except for changing the hydrothermal reaction temperature from 220° C. to 200° C. and the reaction time from 5 hours to 8 hours.

REFERENCE EXAMPLE 9

Fibrous Xonotlite I having an average fiber length of 4 μm and an average fiber diameter of 0.4 (aspect ratio: 10) was prepared in the same manner as in Reference Example 1, except that the amount of tap water as changed to 15 l and the stirring was conducted at 60 rpm.

REFERENCE EXAMPLE 10

Fibrous Xonotlite J having an average fiber length of 5 μm and an average fiber diameter of 0.5 (aspect ratio: 10) was prepared in the same manner as in Reference Example 1, except that the amount of tap water as changed to 12 l and the stirring was conducted at 40 rpm.

EXAMPLE 1

Eighty parts of a nylon 6 resin (UBE Nylon 1013B, produced by Ube Industries, Ltd.) and 20 parts of fibrous Xonotlite A were melt-kneaded in a twin-screw extruder having a barrel diameter of 30 mm (PCM 30, manufactured by Ikegai Corporation; the two screws rotate in the same direction) at a nozzle temperature of 250° C. and pelletized. The fibrous Xonotlite A was fed from a first vent hole (feed opening) by means of a screw feeder, and air was released from a second vent hole. Then, the pellets were injection molded in an injection molding machine Netstal C250, manufactured by Sumitomo Heavy Industries, Ltd.) at a cylinder temperature (the temperature at the nozzle head, hereinafter the same) of 275° C. and a mold temperature of 80° C. to prepare test pieces for physical properties measurement. The test piece had a tensile strength of 115 MPa and an anisotropy of 1.63. Other physical properties are also shown in Table 1.

COMPARATIVE EXAMPLE 1

A test piece was prepared in the same manner as in Example 1, except for replacing fibrous Xonotlite A with fibrous Xonotlite B. The test piece had a tensile strength of 112 MPa and an anisotropy of 1.79.

COMPARATIVE EXAMPLES 2 TO 4

The same procedure as in Example 1 was repeated, except for replacing fibrous Xonotlite A with fibrous Xonotlite C (Comparative Example 2), D (Comparative Example 3) or E (Comparative Example 4). The tensile strength of the test piece containing fibrous Xonotlite C or D was 84 MPa or 81 MPa, respectively. The anisotropy of the test piece containing fibrous Xonotlite C was 1.87 Where fibrous Xonotlite E was used, a uniform compound was not obtained so that the composition could not be molded.

EXAMPLES 2 TO 4

The same procedure as in Example 1 was repeated, except for changing the weight ratio of nylon 6 to fibrous Xonotlite A from 80/20 to 90/10 (Example 2), 70/30 (Example 3) or 60/40 (Example 4). The physical properties of the resulting test pieces are shown in Table 1.

EXAMPLE 5

The same procedure as in Example 1 was repeated, except for replacing fibrous Xonotlite A with fibrous Xonotlite F. The physical properties of the resulting test pieces are shown in Table 1.

EXAMPLE 6

The same procedure as in Example 1 was repeated, except for replacing nylon 6 with nylon 66 (UBE Nylon 2020B, produced by Ube Industries, Ltd.), changing the kneading temperature from 250° C. to 280° C., and changing the cylinder temperature of the injection molding machine from 275° C. to 285° C. The physical properties of the resulting test pieces are shown in Table 1.

temperature from 80° C. to 70° C. The physical properties of the resulting test pieces are shown in Table 1.

EXAMPLE 9

The same procedure as in Example 1 was repeated, except for replacing nylon 6 with modified polyphenylene oxide (Noryl 731J, produced by Engineering Plastics K.K.), changing the kneading temperature from 250° C. to 280° C., and changing the mold temperature from 80° C. to 90° C. The physical properties of the resulting test pieces are shown in Table 1.

EXAMPLE 10

The same procedure as in Example 1 was repeated, except for replacing nylon 6 with a polyacetal copolymer (Iupital F20-13, produced by Mitsubishi Gas Chemical Co., Inc.), changing the kneading temperature from 250° C. to 210° C., and changing the cylinder temperature of the injection molding machine from 275° C. to 210° C. The physical properties of the resulting test pieces are shown in Table 1.

EXAMPLE 11

The same procedure as in Example 1 was repeated, except for replacing nylon 6 with a crystalline ethylene-propylene block copolymer (UBE Polypro J703H, produced by Ube industries, Ltd.), changing the kneading temperature to 210° C. and changing the cylinder temperature and the mold temperature of the injection molding machine to 220° C. and 60° C., respectively. The physical properties of the resulting test pieces are shown in Table 1.

TABLE 1

| | Composition | | | | | | Elastic | | |
| | Organic Polymer | | Fibrous Xonotlite | | Tensile | Bending | Modulus in | Izod Impact | Deflection Temperature |
| Example No. | Kind | Amount (wt %) | Kind | Amount (wt %) | Strength (MPa) | Strength (MPa) | Bending (GPa) | Strength (N · m/m) | under Load (°C.) |
| --- | --- | --- | --- | --- | --- | --- | --- | --- | --- |
| 1 | nylon 6 | 80 | A | 20 | 115 | 171 | 5.68 | 50 | 171 |
| 2 | " | 90 | " | 10 | 97 | 148 | 4.33 | 58 | 148 |
| 3 | " | 70 | " | 30 | 123 | 185 | 7.11 | 50 | 181 |
| 4 | " | 60 | " | 40 | 132 | 196 | 7.89 | 46 | 188 |
| 5 | " | 80 | F | 20 | 115 | 188 | 7.43 | 50 | 182 |
| 6 | nylon 66 | " | A | " | 112 | 160 | 5.95 | 36 | 215 |
| 7 | " | " | G | " | 117 | 170 | 6.30 | 34 | 220 |
| 8 | PBT[1] | " | A | " | 80 | 134 | 5.85 | 49 | 161 |
| 9 | modified PPO[2] | " | " | " | 86 | 125 | 5.71 | 29 | 134 |
| 10 | polyacetal | " | " | " | 71 | 106 | 4.53 | 56 | 163 |
| 11 | PP[3] | " | " | " | 30 | 38 | 2.69 | 74 | 91 |

Note:
[1]Polybutylene terephthalate
[2]Polyphenylene oxide
[3]Crystalline ethylene-propylene block copolymer

EXAMPLE 7

The same procedure as in Example 6 was repeated, except for replacing fibrous Xonotlite A with fibrous Xonotlite G. The physical properties of the resulting test pieces are shown in Table 1.

EXAMPLE 8

The same procedure as in Example 1 was repeated, except for replacing nylon 6 with polybutylene terephthalate (UBE PBT 1000F, produced by Ube Industries, Ltd., hereinafter referred to as a PBT resin), changing the kneading temperature from 250° C. to 270° C., and changing the mold

COMPARATIVE EXAMPLE 5

A compound was prepared in the same manner as in Example 1, except for replacing fibrous Xonotlite A with fibrous Xonotlite H. However, the molten resin strands extruded from the nozzle of the extruder could not be taken up, and kneading could not be carried out stably. Therefore, physical properties of the resulting test piece were not determined.

EXAMPLE 12

A phenol novolak resin (42.5 parts), 6.5 parts of a curing agent (hexamethylenetetramine), 4 parts of a curing accelerator (Ca(OH)$_2$), 40 parts of fibrous Xonotlite A, 3 parts of a plasticizer (furfural/water=1/2), and 1.2 part of a mold release agent (zinc stearate) were kneaded in a two-roll mill (roll diameter: 10 in.) at 150° C. to obtain a phenolic resin composition. The composition was molded in an injection molding machine for thermosetting resins (IR-80AM, manufactured by Toshiba Machine Co., Ltd.) at a cylinder temperature of 95° C. and a mold temperature of 175° C. to prepare a test piece. The test piece had a bending strength of 148 MPa, a Charpy impact strength of 4.0 KPa·m, and a deflection temperature under load of 167° C.

EXAMPLE 13

A test piece was prepared in the same manner as in Example 1, except for replacing nylon 6 with a nylon 12-based elastomer (UBE Polyamide Elastomer PAE1200, produced by Ube Industries, Ltd.), changing the kneading temperature to 190° C., and changing the cylinder temperature of the injection molding machine to 210° C. The test piece had a bending strength of 10 MPa and a bending elastic modulus of 320 MPa.

EXAMPLE 14

Seventy-five parts of an RIM nylon 6 raw material (UBE Nylon RIM General Type UX-A, produced by Ube Industries, Ltd.) were compounded with 25 parts of fibrous Xonotlite F and subjected to reactive processing by means of an RIM molding machine for high temperatures at a feed tank temperature of 130° C. and a mold temperature of 170° C. The resulting test piece had a bending strength of 130 MPa, a bending elastic modulus of 5.9 GPa, an Izod impact strength of 40 N·m/m, and a deflection temperature under load of 180° C.

EXAMPLE 15

A hundred parts of a vinyl chloride resin (Vinychlon 3000P, produced by Mitsui Toatsu Chemicals, Inc.), 2 parts of a plasticizer (dioctyl phthalate), 3.5 parts of a stabilizer (di-n-butyltin dimaleate), and 1 part of a lubricant (calcium stearate/butyl stearate=1/1) were mixed in a Henschel mixer. Eighty parts of the mixture and 20 parts of fibrous Xonotlite A were melt-kneaded in a mixing roll (roll diameter: 8 in.) at 170° C. The resulting blend was pressed at 170° C. to prepare a sheet. The pressed sheet had a tensile modulus of 2.5 GPa.

EXAMPLE 16

Pellets were prepared in the same manner as in Example 1, except for replacing nylon 6 with an ABS resin (Cycolac T, produced by Ube Cyon K.K.) and changing the kneading temperature to 230° C. The pellets were injection molded in the same manner as in Example 1, except for changing the cylinder temperature to 230° C. and a mold temperature to 60° C. The resulting test pieces had a tensile strength of 500 MPa, a bending strength of 800 MPa, a bending elastic modulus of 5.7 GPa, and a deflection temperature under load of 96° C.

EXAMPLE 17

A PBT resin (UBE PBT 1000, produced by Ube Industries, Ltd.), fibrous Xonotlite A, and mica (Szorite Mica 200-KI, produced by Kuraray Co., Ltd.) were melt-kneaded in a twin-screw extruder having a barrel diameter of 30 mm (PCM 30, manufactured by Ikegai Corporation; the two screws rotate in the same direction) at a nozzle temperature of 250° C. to obtain pellets consisting of 80% of PBT resin, 7% of fibrous Xonotlite A, and 13% of mica. The fibrous Xonotlite A and mica were fed from a first vent hole (feed opening) using the respective screw feeder, and air was released from a second vent hole. Then, the pellets were injection molded in an injection molding machine (N100 Model, manufactured by The Japan Steel Works, Ltd.) at a cylinder temperature (the temperature at the nozzle head, hereinafter the same) of 260° C. and a mold temperature of 100° C. to prepare test pieces for physical properties measurement. The physical properties of the test piece are shown in Table 2.

COMPARATIVE EXAMPLE 6

The same procedure as in Example 17 was repeated, except for replacing fibrous Xonotlite A with fibrous Xonotlite B. The physical properties of the resulting test piece are shown in Table 2.

COMPARATIVE EXAMPLES 7 TO 9

The same procedure as in Example 17 was repeated, except for replacing fibrous Xonotlite A with fibrous Xonotlite C (Comparative Example 7), D (Comparative Example 8) or E (Comparative Example 9). The physical properties of the test pieces using Xonotlite C or D are shown in Table 2. Where fibrous Xonotlite E was used, a uniform compound was not obtained so that the composition could not be molded.

EXAMPLE 18

The same procedure as in Example 17 was repeated, except for replacing fibrous Xonotlite A with fibrous Xonotlite F. The physical properties of the test piece are shown in Table 2.

EXAMPLE 19

A test piece was prepared in the same manner as in Example 17, except for replacing the PBT resin with a nylon 66 resin (UBE nylon 2020B), changing the kneading temperature to 290° C., and changing the cylinder temperature of the injection molding machine to 290° C. The physical properties of the test piece are shown in Table 2.

EXAMPLE 20

The same procedure as in Example 17 was repeated, except for replacing fibrous Xonotlite A with fibrous Xonotlite G. The physical properties of the test piece are shown in Table 2.

TABLE 2

| Example No. | Composition | | | | | | | Bending Strength (MPa) | Elastic Modulus in Bending (GPa) | Deflection Temperature under Load (°C.) | Mold Shrinkage Coefficient | |
|---|---|---|---|---|---|---|---|---|---|---|---|---|
| | Thermoplastic Resin (A) | | Fibrous Xonotlite (B) | | | Compound (C) | | | | | | |
| | Kind | Amount (wt %) | Kind | Amount (wt %) | Wb[1] (wt %) | Kind | Amount (wt %) | Wf[2] (wt %) | | | | MD (%) | TD (%) |
| 17 | PBT[3] | 80 | A | 7 | 35 | mica | 13 | 20 | 112 | 5.98 | 169 | 1.23 | 1.46 |
| Compara. 6 | " | " | B | " | " | " | " | " | 97 | 5.40 | 152 | 1.20 | 1.48 |
| Compara. 7 | " | " | C | " | " | " | " | " | 78 | 5.15 | 149 | 1.30 | 1.53 |
| Compara. 8 | " | " | D | " | " | " | " | " | 72 | 5.02 | 140 | 1.32 | 1.52 |
| Compara. 9 | " | " | E | " | " | " | " | " | incapable of molding | | | | |
| 18 | " | " | F | " | " | " | " | " | 120 | 6.05 | 172 | 1.29 | 1.46 |
| 19 | PA66[4] | " | A | " | " | " | " | " | 158 | 6.90 | 210 | 0.81 | 1.14 |
| 20 | " | " | G | " | " | " | " | " | 168 | 6.99 | 215 | 0.77 | 1.08 |

Note:
[1]Weight percentage of (B) based on (B) + (C).
[2]Weight percentage of (B) + (C) based on (A) + (B) + (C).
[3]Polybutylene terephthalate resin.
[4]Nylon 66 resin.

EXAMPLE 21

The same procedure as in Example 17 was repeated, except for replacing the PBT resin with a nylon 6 resin (UBE Nylon 1013B). The physical properties of the resulting test piece are shown in Table 3.

EXAMPLE 22 AND COMPARATIVE EXAMPLES 10 AND 11

The same procedure as in Example 21 was repeated, except for altering the amounts of the nylon 6 resin, fibrous Xonotlite A and mica to be charged as shown in Table 3. The physical properties of the resulting test piece are shown in Table 3.

physical properties of the resulting test piece are shown in Table 4.

EXAMPLE 24

The same procedure as in Example 21 was repeated, except for replacing the nylon 6 resin with a polyphenylene sulfide resin (UBE PPS NR-04, produced by Ube Industries, Ltd.), and changing the melt-kneading temperature and the cylinder and mold temperatures of the injection molding machine to 280° C., 300° C., and 120° C., respectively. The physical properties of the resulting test piece are shown in Table 4.

TABLE 3

| Example No. | Composition | | | | | | | Bending Strength (MPa) | Elastic Modulus in Bending (GPa) | Deflection Temperature under Load (°C.) | Mold Shrinkage Coefficient | | |
|---|---|---|---|---|---|---|---|---|---|---|---|---|---|
| | Thermoplastic Resin (A) | | Fibrous Xonotlite (B) | | | Compound (C) | | | | | | | |
| | Kind | Amount (wt %) | Kind | Amount (wt %) | Wb[1] (wt %) | Kind | Amount (wt %) | Wf[2] (wt %) | | | | MD (%) | TD (%) | TD/MD |
| 21 | PA6[3] | 80 | A | 7 | 35 | mica | 13 | 20 | 152 | 6.39 | 172 | 0.67 | 0.90 | 1.34 |
| 22 | " | 55 | " | 25 | 56 | " | 20 | 45 | 163 | 9.05 | 189 | 0.73 | 1.03 | 1.41 |
| Compara. 10 | " | 80 | " | 0 | 0 | " | " | 20 | 137 | 5.60 | 157 | 0.88 | 1.12 | 1.27 |
| Compara. 11 | " | " | " | 20 | 20 | " | 0 | 20 | 173 | 6.69 | 174 | 0.52 | 0.84 | 1.63 |

Note:
[1]Weight percentage of (B) based on (B) + (C).
[2]Weight percentage of (B) + (C) based on (A) + (B) + (C).
[3]Nylon 6 resin.

EXAMPLE 23

The same procedure as in Example 21 was repeated, except for replacing mica with glass beads (GB 210A, produced by Toshiba Ballotini Co., Ltd.; average particle diameter: 17 μm) as component (C) and changing the amounts of the nylon 6 resin, fibrous Xonotlite A and component (C) to be charged as shown in Table 4. The

EXAMPLE 25

The same procedure as in Example 21 was repeated, except for replacing the nylon 6 resin with a polypropylene resin (ethylene-propylene block copolymer, UBE Polypro J709HK, produced by Ube Industries, Ltd.), replacing mica with talc (Talcan Powder PK-C, produced by Hayashi Kasei K.K.), and changing the melt-kneading temperature and the cylinder and mold temperatures of the injection molding machine to 230° C., 230° C., and 80° C., respectively. The physical properties of the resulting test piece are shown in Table 4.

EXAMPLE 26

The same procedure as in Example 25 was repeated, except for replacing talc with calcium carbonate (Ryton PO Filler, produced by Shiraishi Calcium K.K.). The physical properties of the resulting test piece are shown in Table 4.

COMPARATIVE EXAMPLE 12

The same procedure as in Example 27 was repeated, except for replacing fibrous Xonotlite A with fibrous Xonotlite B. The physical properties of the resulting test piece are shown in Table 5.

COMPARATIVE EXAMPLES 13 TO 15

The same procedure as in Example 27 was repeated, except for replacing fibrous Xonotlite A with fibrous Xonot-

TABLE 4

| Example No. | Composition | | | | | | | | Bending Strength (MPa) | Elastic Modulus in Bending (GPa) | Deflection Temperature under Load (°C.) | Mold Shrinkage Coefficient | |
|---|---|---|---|---|---|---|---|---|---|---|---|---|---|
| | Thermoplastic Resin (A) | | Fibrous Xonotlite (B) | | | Compound (C) | | | | | | | |
| | Kind | Amount (wt %) | Kind | Amount (wt %) | Wb[1] (wt %) | Kind | Amount (wt %) | Wf[2] (wt %) | | | | MD (%) | TD (%) |
| 23 | PA6[3] | 80 | A | 10 | 50 | glass beads | 10 | 20 | 148 | 5.30 | 149 | 0.90 | 1.07 |
| 24 | PPS[4] | " | " | 7 | 35 | mica | 13 | " | 167 | 8.47 | 264 | 0.56 | 0.67 |
| 25 | PP[5] | " | " | " | " | talc | " | " | 50 | 3.44 | 139 | 1.36 | 1.52 |
| 26 | " | " | " | 10 | 50 | CaCO₃ | 10 | " | 44 | 2.34 | 129 | 0.52 | 1.72 |

Note:
[1] Weight percentage of (B) based on (B) + (C).
[2] Weight percentage of (B) + (C) based on (A) + (B) + (C).
[3] Nylon 6 resin.
[4] Polyphenylene sulfide resin.
[5] Polypropylene resin.

EXAMPLE 27

A nylon 6 resin (UBE Nylon 1013B), an ionomer (Himilan 1855, produced by Du Pont-Mitsui Polychemicals Co., Ltd.), fibrous Xonotlite A, and glass fiber chopped strands (CS-3PE 956, produced by Nitto Boseki Co., Ltd.; fiber diameter: 13 μm; fiber length: 3 mm) were melt-kneaded in a twin-screw extruder having a barrel diameter of 30 mm (PCM 30; the two screws rotate in the same direction) at a nozzle temperature of 250° C. to obtain pellets consisting of 70% of the nylon 6 resin, 10% of the ionomer, 13% of fibrous Xonotlite A, and 7% of glass fiber. The fibrous Xonotlite A and glass fiber were fed from a first vent hole (feed opening) using the respective screw feeder, and air was released from a second vent hole. Then, the pellets were injection molded in an injection molding machine (N100 Model) at a cylinder temperature of 260° C. and a mold temperature of 100° C. to prepare test pieces for physical properties measurement. The physical properties of the test piece are shown in Table 5.

lite C (Comparative Example 13), D (Comparative Example 14) or E (Comparative Example 15). The physical properties of the test pieces using Xonotlite C or D are shown in Table 5. Where fibrous Xonotlite E was used, a uniform compound was not obtained so that the composition could not be molded.

EXAMPLE 28

The same procedure as in Example 27 was repeated, except for replacing fibrous Xonotlite A with fibrous Xonotlite F. The physical properties of the test pieces are shown in Table 5.

COMPARATIVE EXAMPLE 16

The same procedure as in Example 27 was repeated, except for changing the amounts of fibrous Xonotlite A and glass fiber to be charged as shown in Table 5. The physical properties of the test piece are shown in Table 5.

TABLE 5

| | Example 27 | Compara. Example 12 | Compara. Example 13 | Compara. Example 14 | Compara. Example 15 | Example 28 | Compara. Example 16 |
|---|---|---|---|---|---|---|---|
| Composition: | | | | | | | |
| Thermoplastic resin (A1) (Amount; wt %) | PA6[1] (70) | PA6 (70) | PA6 (70) | PA6 (70) | PA6 (70) | PA6 (70) | PA6 (70) |
| Polymer (A2) (Amount; wt %) | ionomer (10) | ionomer (10) | ionomer (10) | ionomer (10) | ionomer (10) | ionomer (10) | ionomer (10) |
| Wa[2] (wt %) | 12.5 | 12.5 | 12.5 | 12.5 | 12.5 | 12.5 | 12.5 |
| Fibrous Xonotlite (B) | A | B | C | D | E | F | A |
| (Amount; wt %) | (13) | (13) | (130) | (130) | (130) | (13) | (0) |

TABLE 5-continued

|  | Example 27 | Compara. Example 12 | Compara. Example 13 | Compara. Example 14 | Compara. Example 15 | Example 28 | Compara. Example 16 |
|---|---|---|---|---|---|---|---|
| Wb[3] (wt %) | 65 | 65 | 65 | 65 | 65 | 65 | 0 |
| Component (C) (Amount; wt %) | glass fiber (7) | glass fiber (7) | glass fiber (7) | glass fiber (7) | glass fiber (7) | glass fiber (7) | glass fiber (20) |
| Wf[4] (wt %) | 20 | 20 | 20 | 20 | 20 | 20 | 20 |
| Properties: | | | | | | | |
| Bending strength (MPa) | 130 | 121 | 95 | 92 | —[5] | 137 | 143 |
| Elastic modulus in bending (GPa) | 4.53 | 4.23 | 4.05 | 4.01 | — | 4.74 | 4.61 |
| Izod impact strength (N · m/m) | 76 | 70 | 31 | 30 | — | 82 | 103 |
| Deflection temperature under load (°C.) | 181 | 173 | 167 | 164 | — | 188 | 197 |
| Mold shrinkage coefficient: | | | | | | | |
| MD (%) | 0.74 | 0.71 | 0.76 | 0.77 | — | 0.74 | 0.68 |
| TD (%) | 1.14 | 1.12 | 1.15 | 1.16 | — | 1.12 | 1.99 |
| TD/MD | 1.54 | 1.58 | 1.51 | 1.51 | — | 1.51 | 2.92 |
| Appearance | good | good | good | good | — | good | poor |

Note:
[1] Nylon 6 resin.
[2] Weight percentage of (A2) based on (A1) + (A2).
[3] Weight percentage of (B) based on (B) + (C).
[4] Total content of (B) + (C) based on (A1) + (A2) + (C) + (B).
[5] Incapable of molding.

EXAMPLE 29

The same procedure as in Example 27 was repeated, except for replacing the nylon 6 resin with a polypropylene resin (ethylene-propylene block copolymer, UBE Polypro J709HK), replacing the ionomer with an ethylene-propylene rubber (JSR EP07P, produced by Japan Synthetic Rubber Co., Ltd.), replacing glass fiber with talc (Talcan Powder PK-C; average particle size: 11 μm), and changing the melt-kneading temperature and the cylinder and mold temperatures of the injection molding machine to 230° C., 230° C., and 80° C., respectively. The physical properties of the resulting test piece are shown in Table 6.

EXAMPLE 30

The same procedure as in Example 29 was repeated, except for replacing fibrous Xonotlite A with fibrous Xonotlite G. The physical properties of the resulting test pieces are shown in Table 6.

EXAMPLE 31

The same procedure as in Example 29 was repeated, except for changing the amounts of the polypropylene resin, fibrous Xonotlite A, and talc as shown in Table 6. The physical properties of the resulting test pieces are shown in Table 6.

COMPARATIVE EXAMPLES 17 AND 18

The same procedure as in Example 29 was repeated, except for changing the amounts of fibrous Xonotlite A and talc as shown in Table 6. The physical properties of the resulting test pieces are shown in Table 6.

EXAMPLE 32 AND COMPARATIVE EXAMPLES 19 AND 20

The same procedure as in Example 29 was repeated, except for changing the amounts. the polypropylene resin and the ethylene-propylene rubber as shown in Table 6. The physical properties of the resulting test pieces are shown in Table 6.

TABLE 6

|  | Example 29 | Example 30 | Example 31 | Compara. Example 17 | Compara. Example 18 | Example 32 | Compara. Example 19 | Compara. Example 20 |
|---|---|---|---|---|---|---|---|---|
| Composition: | | | | | | | | |
| Thermoplastic resin (A1) (Amount; wt %) | PP[1] (70) | PP (70) | PP (45) | PP (70) | PP (70) | PP (60) | PP (77) | PP (36) |
| Polymer (A2) (Amount; wt %) | EPR[2] (10) | EPR (10) | EPR (10) | EPR (10) | EPR (10) | EPR (20) | EPR (3) | EPR (44) |
| Wa[3] (wt %) | 12.5 | 12.5 | 12.5 | 12.5 | 12.5 | 25 | 3.8 | 55 |
| Fibrous Xonotlite (B) (Amount; wt %) | A (7) | G (7) | A (25) | A (0) | A (20) | A (7) | A (7) | A (7) |
| Wb[4] (wt %) | 35 | 35 | 56 | 0 | 20 | 35 | 35 | 35 |
| Component (C) (Amount; wt %) | talc (13) | talc (13) | talc (20) | talc (20) | talc (0) | talc (13) | talc (13) | talc (13) |

TABLE 6-continued

|  | Example 29 | Example 30 | Example 31 | Compara. Example 17 | Compara. Example 18 | Example 32 | Compara. Example 19 | Compara. Example 20 |
|---|---|---|---|---|---|---|---|---|
| Wf[5] (wt %) | 20 | 20 | 45 | 20 | 20 | 20 | 20 | 20 |
| Properties: | | | | | | | | |
| Bending strength (MPa) | 39 | 44 | 42 | 32 | 37 | 28 | 47 | 27 |
| Elastic modulus in bending (GPa) | 2.64 | 2.77 | 4.07 | 1.78 | 2.04 | 1.51 | 2.97 | 1.48 |
| Izod impact strength (N · m/m) | 95 | 101 | 89 | 62 | 106 | 315 | 40 | NB |
| Deflection temperature under load (°C.) | 129 | 133 | 144 | 120 | 126 | 124 | 125 | 101 |
| Mold shrinkage coefficient: | | | | | | | | |
| MD (%) | 1.43 | 1.42 | 1.21 | 1.38 | 1.35 | 1.51 | 1.37 | 1.69 |
| TD (%) | 1.64 | 1.61 | 1.03 | 1.39 | 1.76 | 1.72 | 1.54 | 1.76 |
| TD/MD | 1.15 | 1.13 | 1.18 | 0.99 | 1.30 | 1.14 | 1.12 | 1.04 |

Note:
[1] Polypropylene resin.
[2] Ethylene-propylene rubber.
[3] Weight percentage of (A2) based on (A1) + (A2).
[4] Weight percentage of (B) based on (B) + (C).
[5] Total content of (B) + (C) based on (A1) + (A2) + (C) + (B).

EXAMPLE 33

To an emulsion containing 5 kg of polybutadiene rubber were added 1.3 kg of acrylonitrile and 3.8 kg of styrene, and 20 g of benzoyl peroxide was further added thereto. The mixture was heated at 60° C. with stirring to conduct polymerization for 5 hours. The resulting polymer liquid was coagulated by addition of a small amount of sulfuric acid and filtered. The filter cake was washed and dried to obtain an impact-resistant ABS resin. The resulting impact-resistant ABS resin had a rubber content of 50% and an average rubber particle size of 0.3 µm.

The same procedure as in Example 27 was repeated, except for replacing the ionomer with the above-prepared impact-resistant ABS resin, replacing glass fiber with glass beads (GB 210A; average particle diameter: 17 µm), and changing the melt-kneading temperature and the cylinder temperature of the injection molding machine to 280° C. and 290° C., respectively. The physical properties of the resulting test piece are shown in Table 7.

EXAMPLE 34

To 100 parts of a styrene-ethylene-butadiene-styrene elastomer (SEBS) (Tuftec H1041, produced by Asahi Chemical Industry Co., Ltd.) were added 2.6 parts of glycidyl methacrylate and 0.2 part of t-butyl peroxybenzoate, and the mixture was kneaded in a Brabender type melt-kneading machine at 260° C. for 10 minutes in a nitrogen atmosphere. The resulting blend was ground and washed with acetone to obtain a modified SEBS thermoplastic elastomer. The epoxy group concentration in the elastomer was 7.1×10 mol/g as measured according to a titration method (JIS K7236).

The same procedure as in Example 27 was repeated, except for replacing the nylon 6 resin with a polyphenylene sulfide resin (UBE PPS NR-04), replacing the ionomer with the above-prepared modified SEBS thermoplastic elastomer, replacing glass fiber with mica (Szorite Mica 200-KI), and changing the melt-kneading temperature and the cylinder and mold temperatures of the injection molding machine to 300° C., 300° C., and 130° C., respectively. The physical properties of the resulting test piece are shown in Table 7.

TABLE 7

|  | Example 33 | Example 34 |
|---|---|---|
| Composition: | | |
| Thermoplastic resin (A1) | PA6[1] | PPS[2] |
| (Amount; wt %) | (70) | (70) |
| Polymer (A2) (Amount; wt %) | ABS[3] | SEBS[4] |
|  | (10) | (10) |
| Wa[5] (wt %) | 12.5 | 12.5 |
| Fibrous Xonotlite (B) | A | A |
| (Amount; wt %) | (7) | (7) |
| Wb[6] (wt %) | 35 | 35 |
| Component (C) | glass beads | mica |
| (Amount; wt %) | (13) | (13) |
| Wf[7] (wt %) | 20 | 20 |
| Properties: | | |
| Bending strength (MPa) | 132 | 125 |
| Elastic modulus in bending (GPa) | 5.25 | 6.14 |
| Izod impact strength (N · m/m) | 72 | 33 |
| Deflection temperature under load (°C.) | 145 | 190 |
| Mold shrinkage coefficient: | | |
| MD (%) | 0.91 | 0.62 |
| TD (%) | 1.16 | 0.78 |
| TD/MD | 1.28 | 1.25 |

Note:
[1] Nylon 6 resin.
[2] Polyphenylene sulfide resin.
[3] Impact-resistant acrylonitrile-styrene-butadiene resin.
[4] Styrene-ethylene-butadiene-styrene thermoplastic elastomer.
[5] Weight percentage of (A2) based on (A1) + (A2).
[6] Weight percentage of (B) based on (B) + (C).
[7] Total content of (B) + (C) based on (A1) + (A2) + (C) + (B).

EXAMPLE 35

A PBT resin (UBE PBT 1000, produced by Ube Industries, Ltd.), fibrous Xonotlite A, and glass fiber chopped strands (CS-3J 951, produced by Nitto Boseki Co., Ltd.; fiber diameter: 10 µm; fiber length: 3 mm) were melt-kneaded in a twin-screw extruder having a barrel diameter of 30 mm (PCM 30, manufactured by Ikegai Corporation; the two screws rotate in the same direction) at a nozzle temperature of 250° C. to obtain pellets consisting of 80% of PBT resin, 13% of fibrous Xonotlite A, and 7% of glass fiber. The fibrous Xonotlite A and glass fiber were fed from a first vent hole (feed opening) using the respective screw feeder, and air was released from a second vent hole. Then, the pellets were injection molded in an injection molding machine (N100 Model, manufacture by The Japan Steel Works, Ltd.) at a cylinder temperature (the temperature at the nozzle head, hereinafter the same) of 260° C. and a mold temperature of 100° C. to prepare test pieces for physical properties measurement. The physical properties of the test piece are shown in Table 8.

COMPARATIVE EXAMPLE 21

The same procedure as in Example 35 was repeated, except for replacing fibrous Xonotlite A with fibrous Xonotlite B. The physical properties of the resulting test piece are shown in Table 8.

COMPARATIVE EXAMPLES 22 TO 24

The same procedure as in Example 35 was repeated, except for replacing fibrous Xonotlite A with fibrous Xonotlite C (Comparative Example 22), D (Comparative Example 23) or E (Comparative Example 24). The physical properties of the test pieces using Xonotlite C or D are shown in Table 8. Where fibrous Xonotlite E was used, a uniform compound was not obtained so that the composition could not be molded.

EXAMPLE 36

The same procedure as in Example 35 was repeated, except for replacing fibrous Xonotlite A with fibrous F. The physical properties of the test piece are shown in Table 8.

EXAMPLE 37

A test piece was prepared in the same manner as in Example 35, except for replacing the PBT resin with a nylon 66 resin (UBE nylon 2020B), changing the glass fiber chopped strands used in Example 35 to glass fiber chopped strands (CS-3PE 227, produced by Nitto Boseki Co., Ltd.; fiber diameter: 13 μm; fiber length: 3 mm), changing the kneading temperature to 290° C., and changing the cylinder temperature of the injection molding machine to 290° C. The physical properties of the test piece are shown in Table 8.

EXAMPLE 38

The same procedure as in Example 35 was repeated, except for replacing fibrous Xonotlite A with fibrous G. The physical properties of the test piece are shown in Table 8.

TABLE 8

| | Composition | | | | | | | | | Deflection | Mold | | |
| | Thermoplastic Resin (A) | | Fibrous Xonotlite (B) | | | Compound (C) | | | Bending | Elastic Modulus in | Temperature under | Shrinkage Coefficient | | Anisotropy |
| Example No. | Kind | Amount (wt %) | Kind | Amount (wt %) | Wb[1] (wt %) | Kind | Amount (wt %) | Wf[2] (wt %) | Strength (MPa) | Bending (GPa) | Load (°C.) | MD (%) | TD (%) | TD/MD |
|---|---|---|---|---|---|---|---|---|---|---|---|---|---|---|
| 35 | PBT[3] | 80 | A | 13 | 65 | glass fiber | 7 | 20 | 146 | 6.12 | 200 | 0.90 | 1.55 | 1.72 |
| Compara. 21 | " | " | B | " | " | glass fiber | " | " | 134 | 5.85 | 191 | 0.89 | 1.58 | 1.78 |
| Compara. 22 | " | " | C | " | " | glass fiber | " | " | 106 | 5.28 | 180 | 0.98 | 1.62 | 1.65 |
| Compara. 23 | " | " | D | " | " | glass fiber | " | " | 101 | 5.15 | 176 | 1.01 | 1.61 | 1.59 |
| Compara. 24 | " | " | E | " | " | glass fiber | " | " | incapable of molding | | | | | |
| 36 | " | " | F | " | " | glass fiber | " | " | 152 | 6.29 | 207 | 0.97 | 1.54 | 1.59 |
| 37 | PA66[4] | " | A | " | " | glass fiber | " | " | 183 | 7.30 | 238 | 0.40 | 0.86 | 2.14 |
| 38 | " | " | G | " | " | glass fiber | " | " | 191 | 7.42 | 243 | 0.36 | 0.78 | 2.17 |

Note:
[1] Weight percentage of (B) based on (B) + (C).
[2] Weight percentage of (B) + (C) based on (A) + (B) + (C).
[3] Polybutylene terephthalate resin.
[4] Nylon 66 resin.

EXAMPLE 39

The same procedure as in Example 37 was repeated, except for replacing the nylon 66 resin with a nylon 6 resin (UBE nylon 1013B), changing glass fiber chopped strands used in Example 37 to glass fiber chopped strands (CS-3PE 454, produced by Nitto Boseki Co., Ltd.; fiber diameter: 13 μm; fiber length: 3 mm), changing the kneading temperature to 250° C. changing the cylinder temperature of the injection molding machine to 260° C. The physical properties of the resulting test piece are shown in Table 9.

EXAMPLE 40 AND COMPARATIVE EXAMPLES 25 AND 26

The same procedure as in Example 39 was repeated, except for altering the amounts of the nylon 6 resin, fibrous Xonotlite A and glass fiber to be charged as shown in Table 9. The physical properties of the resulting test piece are shown in Table 9.

EXAMPLE 43

The same procedure as in Example 35 was repeated, except for replacing the PBT resin with a polypropylene resin (ethylene-propylene block copolymer, UBE Polypro J709HK, produced by Ube Industries, Ltd.), replacing the glass fiber used in Example 35 with glass fiber chopped strands (CS-3PE 956, produced by Nitto Boseki Co., Ltd.;

TABLE 9

| | Composition | | | | | | | Bending Strength (MPa) | Elastic Modulus in Bending (GPa) | Deflection Temperature under Load (°C.) | Mold Shrinkage Coefficient | | |
|---|---|---|---|---|---|---|---|---|---|---|---|---|---|
| | Thermoplastic Resin (A) | | Fibrous Xonotlite (B) | | | Compound (C) | | | | | | | |
| Example No. | Kind | Amount (wt %) | Kind | Amount (wt %) | Wb[1] (wt %) | Kind | Amount (wt %) | Wf[2] (wt %) | | | | MD (%) | TD (%) | TD/MD |
| 35 | PA6[3] | 80 | A | 13 | 65 | glass fiber | 7 | 20 | 182 | 6.49 | 197 | 0.46 | 0.76 | 1.76 |
| 40 | " | 55 | " | 25 | 56 | glass fiber | 20 | 45 | 225 | 8.95 | 210 | 0.36 | 0.77 | 2.14 |
| Compara. 25 | " | 80 | " | 0 | 0 | glass fiber | " | 20 | 204 | 6.71 | 207 | 0.35 | 1.11 | 3.15 |
| Compara. 26 | " | " | " | 20 | 20 | glass fiber | 0 | 20 | 171 | 5.68 | 171 | 0.52 | 0.84 | 1.63 |

Note:
[1] Weight percentage of (B) based on (B) + (C).
[2] Weight percentage of (B) + (C) based on (A) + (B) + (C).
[3] Nylon 6 resin.

EXAMPLE 41

The same procedure as in Example 35 was repeated, except for replacing the PBT resin with a polyphenylene sulfide resin (UBE PPS NR-04, produced by Ube Industries, Ltd.), changing the glass fiber chopped strands used in Example 35 to glass fiber chopped strands (CS-3J 961, produced by Nitto Boseki Co., Ltd.; fiber diameter: 10 μm; fiber length: 3 mm), changing the kneading temperature to 280° C., changing the cylinder temperature of the injection molding machine to 300° C., and changing the mold temperature to 130° C. The physical properties of the resulting test piece are shown in Table 10.

EXAMPLE 42

The same procedure as in Example 35 was repeated, except for replacing the glass fiber with carbon fiber chopped strands (Torayca Chopped Fiber T008, produced by Toray Co., Ltd.; fiber diameter: 7 μm; fiber length: 3 mm). The physical properties of the resulting test piece are shown in Table 10.

fiber diameter: 13 μm; fiber length: 3 mm), changing the kneading temperature to 230° C., changing the cylinder temperature of the injection molding machine to 230° C., and changing the mold temperature to 80° C. The physical properties of the resulting test piece are shown in Table 10.

TABLE 10

| | Composition | | | | | | | Bending Strength (MPa) | Elastic Modulus in Bending (GPa) | Deflection Temperature under Load (°C.) | Mold Shrinkage Coefficient | | Anisotropy |
|---|---|---|---|---|---|---|---|---|---|---|---|---|---|---|
| | Thermoplastic Resin (A) | | Fibrous Xonotlite (B) | | | Compound (C) | | | | | | | | |
| Example No. | Kind | Amount (wt %) | Kind | Amount (wt %) | Wb[1] (wt %) | Kind | Amount (wt %) | Wf[2] (wt %) | | | | MD (%) | TD (%) | TD/MD |
| 41 | PBS[4] | 80 | A | 13 | 65 | glass fiber | 7 | 20 | 121 | 7.90 | 247[6] | 0.49 | 0.78 | 1.59 |
| 42 | PPS[4] | " | " | " | " | carbon fiber | " | " | 153 | 13.40 | 242[6] | 0.38 | 1.16 | 3.05 |

TABLE 10-continued

| | Composition | | | | | | | | Elastic | Deflection Temperature | Mold Shrinkage Coefficient | | Anisotropy |
|---|---|---|---|---|---|---|---|---|---|---|---|---|---|
| | Thermoplastic Resin (A) | | Fibrous Xonotlite (B) | | | Compound (C) | | | Bending | Modulus in | under | | |
| Example No. | Kind | Amount (wt %) | Kind | Amount (wt %) | Wb[1] (wt %) | Kind | Amount (wt %) | Wf[2] (wt %) | Strength (MPa) | Bending (GPa) | Load (°C.) | MD (%) | TD (%) | TD/MD |
| 43 | PP[5] | " | " | " | " | glass fiber | " | " | 45.1 | 3.37 | 147[7] | 1.02 | 1.58 | 1.55 |

Note:
[1] Weight percentage of (B) based on (B) + (C).
[2] Weight percentage of (B) + (C) based on (A) + (B) + (C).
[3] Nylon 6 resin.
[4] Polyphenylene resin.
[5] Polypropylene resin.
[6] Measured under a load of 1.82 MPa
[7] Measured under a load of 0.45 MPa

EXAMPLE 44

The same procedures as in Example 1 was repeated, except for replacing fibrous Xonotlite A with fibrous Xonotlite I. The resulting test piece had a tensile strength of 171 MPa and a good appearance.

COMPARATIVE EXAMPLE 27

The same procedures as in Example 1 was repeated, except for replacing fibrous Xonotlite A with fibrous Xonotlite J. The resulting test piece had a tensile strength of 170 MPa and a poor appearance.

According to the present invention, the use of fibrous Xonotlite having specific properties as a reinforcement makes it possible to provide an organic polymer composite material having higher strength, higher rigidity, and better balance between heat resistance and impact resistance than conventional fibrous inorganic substance/organic polymer composite materials. The use of the fibrous Xonotlite also provides a thermoplastic resin composition having excellent mechanical characteristics, such as strength and rigidity, excellent heat resistance, and small mold shrinkage.

Therefore, the reinforced organic polymer compositions according to the present invention are useful as a molding material for automobile parts, electric and electronic parts, civil engineering equipment components, precision machinery components, and the like.

While the invention has been described in detail and with reference to specific examples thereof, it will be apparent to one skilled in the art that various changes and modifications can be made therein without departing from the spirit and scope thereof.

What is claimed is:

1. A Xonotlite-reinforced organic polymer composition obtained by mixing (A) an organic polymer and (B) fibrous Xonotlite, in which said fibrous Xonotlite (1) satisfies conditions (a), (b), and (c):
      (a) $0.1 \ \mu m \leq D \leq 0.4 \ \mu m$
      (b) $1 \ \mu m \leq L < 5 \ \mu m$
      (c) $10 \leq L/D \leq 15$
      wherein D and L represent an average fiber diameter and an average fiber length, respectively, of fibrous Xonotlite (B);
   (2) has a BET specific surface area of not less than 21 m²/g as measured by nitrogen adsorption;
   (3) has had its surface treated with a surface active agent and/or a coupling agent; and
   (4) has been formed into granules.

2. A Xonotlite-reinforced organic polymer composition as claimed in claim 1, wherein said organic polymer (A) comprises (A1) a thermoplastic resin.

3. A Xonotlite-reinforced organic polymer composition as claimed in claim 1, wherein said organic polymer (A) comprises a thermosetting resin.

4. A Xonotlite-reinforced organic polymer composition as claimed in claim 1, wherein said composition further comprises (C) a nonfibrous filler and/or reinforcing fiber;

said organic polymer (A) comprises (A1) a thermoplastic resin;

the total amount of components (B) and (C) is from 5 to 65% by weight based on the total amount of components (A1), (B), and (C); and the total amount of component (B) is from 5 to 70% by weight based on the total amount of components (B) and (C).

5. A Xonotlite-reinforced organic polymer composition as claimed in claim 4, wherein said organic polymer (A) comprises (A1) a thermoplastic resin and (A2) at least one polymer selected from the group consisting of rubber, a thermoplastic elastomer, and a rubber-modified thermoplastic resin;

the total amount of component (B) and (C) 1is from 5 to 65% by weight based on the total amount of components (A1), (A2), (B), and (C);

the amount of component (A2) is from 5 to 70% by weight based on the total amount of components (A1) and (A2); and the amount of component (B) is from 5 to 70% by weight based on the total amount of components (B) and (C).

6. A Xonotlite-reinforced organic polymer composition as claimed in claim 1, wherein said fibrous Xonotlite has a BET specific surface area of not less than 30 m²/g as measured by nitrogen adsorption.

7. A Xonotlite-reinforced organic polymer composition as claimed in claim 4, wherein said fibrous Xonotlite has a BET specific surface area of not less than 30 m²/g as measured by nitrogen adsorption.

8. A Xonotlite-reinforced organic polymer composition as claimed An claim 5, wherein said fibrous Xonotlite has a BET specific surface area of not less than 30 m²/g as measured by nitrogen adsorption.

9. A Xonotlite-reinforced organic polymer composition as claimed in claim 4, wherein said thermoplastic resin (A1) is at least one of polyolefin resins, polyamide resins, polyester resins, polyacetal resins, polyarylene sulfide resins, and ABS resins.

10. A Xonotlite-reinforced organic polymer composition as claimed in claim 5, wherein said thermoplastic resin (A1) is at least one of polyolefin resins, polyamide resins, polyester resins, polyacetal resins, polyarylene sulfide resins, and ABS resins.

11. A Xonotlite-reinforced organic polymer composition as claimed in claim 5, wherein said polymer (A2) is at least one of ethylene-propylene rubbers, polyolefin elastomers, polystyrene elastomers, and impact-resistant ABS resins.

* * * * *